(12) United States Patent
Vasseur et al.

(10) Patent No.: US 9,219,682 B2
(45) Date of Patent: Dec. 22, 2015

(54) MINTREE-BASED ROUTING IN HIGHLY CONSTRAINED NETWORKS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US); Jonathan W. Hui, Belmont, CA (US)

(73) Assignee: Cisco Technology, Inc., San Jose, CA (US)

(*) Notice: Subject to any disclaimer, the term of this patent is extended or adjusted under 35 U.S.C. 154(b) by 267 days.

(21) Appl. No.: 13/668,894

(22) Filed: Nov. 5, 2012

(65) Prior Publication Data

US 2014/0126426 A1 May 8, 2014

(51) Int. Cl.
H04L 12/28 (2006.01)
H04L 12/753 (2013.01)
H04L 12/751 (2013.01)

(52) U.S. Cl.
CPC ............ *H04L 45/48* (2013.01); *H04L 45/02* (2013.01)

(58) Field of Classification Search
CPC ........ H04L 45/48; H04L 12/44; H04L 45/122
USPC ....................................................... 370/256
See application file for complete search history.

(56) References Cited

U.S. PATENT DOCUMENTS

| | | | | |
|---|---|---|---|---|
| 4,466,060 A * | 8/1984 | Riddle | | 709/242 |
| 5,459,725 A * | 10/1995 | Bodner et al. | | 370/390 |
| 6,134,599 A * | 10/2000 | Chiu et al. | | 709/252 |
| 7,986,643 B2 * | 7/2011 | Thubert et al. | | 370/256 |
| 7,995,499 B2 | 8/2011 | Sharma et al. | | |
| 8,189,482 B2 | 5/2012 | Vasseur et al. | | |
| 2005/0111349 A1 * | 5/2005 | Vasseur et al. | | 370/216 |
| 2010/0208733 A1 * | 8/2010 | Zhao et al. | | 370/390 |
| 2010/0265869 A1 * | 10/2010 | Sarikaya | | 370/312 |
| 2011/0211445 A1 * | 9/2011 | Chen | | 370/221 |
| 2011/0228696 A1 | 9/2011 | Agarwal et al. | | |
| 2012/0213124 A1 | 8/2012 | Vasseur et al. | | |
| 2012/0320768 A1 | 12/2012 | Shaffer et al. | | |
| 2012/0320923 A1 | 12/2012 | Vasseur et al. | | |
| 2013/0028140 A1 | 1/2013 | Hui et al. | | |

OTHER PUBLICATIONS

Winter, et al., "RPL: IPv6 Routing Protocol for Low-Power and Lossy Networks", IETF Request for Comments 6550, Mar. 2012, 157 pages.

* cited by examiner

*Primary Examiner* — Dang Ton
*Assistant Examiner* — Abdeltif Ajid
(74) *Attorney, Agent, or Firm* — Parker Ibrahim & Berg LLC; James M. Behmke; Stephen D. LeBarron

(57) ABSTRACT

In one embodiment, a capable node in a computer network may host a path computation element, receive one or more neighborhood discovery messages including neighborhood information from a plurality of nodes in the computer network, and compute a minimum spanning tree (MinTree) for the computer network based on the neighborhood information. The MinTree may divide the plurality of nodes in the computer network into a first subset of routing nodes and a second subset of host nodes. The first subset of routing nodes may form one or more interconnected paths of routing nodes within the MinTree, and each host node within the second subset of host nodes may be located within one hop of at least one routing node. The capable node may then communicate a MinTree message to the plurality of nodes in the computer network to build the MinTree by enabling routing on each routing node.

21 Claims, 14 Drawing Sheets

MINTREE-BASED ROUTING IN HIGHLY CONSTRAINED NETWORKS

TECHNICAL FIELD

The present disclosure relates generally to computer networks, and, more particularly, to routing in low power and lossy networks (LLNs).

BACKGROUND

Constrained networks such as, for example, Low power and Lossy Networks (LLNs), e.g., sensor networks, have a myriad of applications, such as Smart Grid, Smart Cities, home and building automation, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

One of the most critical challenges presented by LLNs is routing. Two fundamentally different routing approaches have been envisioned for LLN/ad-hoc networks: proactive and reactive routing protocols. In proactive routing protocols such as, for example, intermediate system to intermediate system (IS-IS), open shortest path first (OSPF), routing information protocol (RIP), and routing protocol for LLNs (RPL), routing topologies are pre-computed by the control plane. In reactive routing protocols such as, for example ad hoc on demand distance vector (AODV) and ad hoc on demand distance vector (LOAD), network routes are computed on-the-fly and on-demand through the use of discovery probes that are transmitted throughout the network. While both proactive and reactive routing protocols have been deployed in real-world LLNs, both types of protocols impose a relatively high level of complexity on network end nodes that may hinder network scalability.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
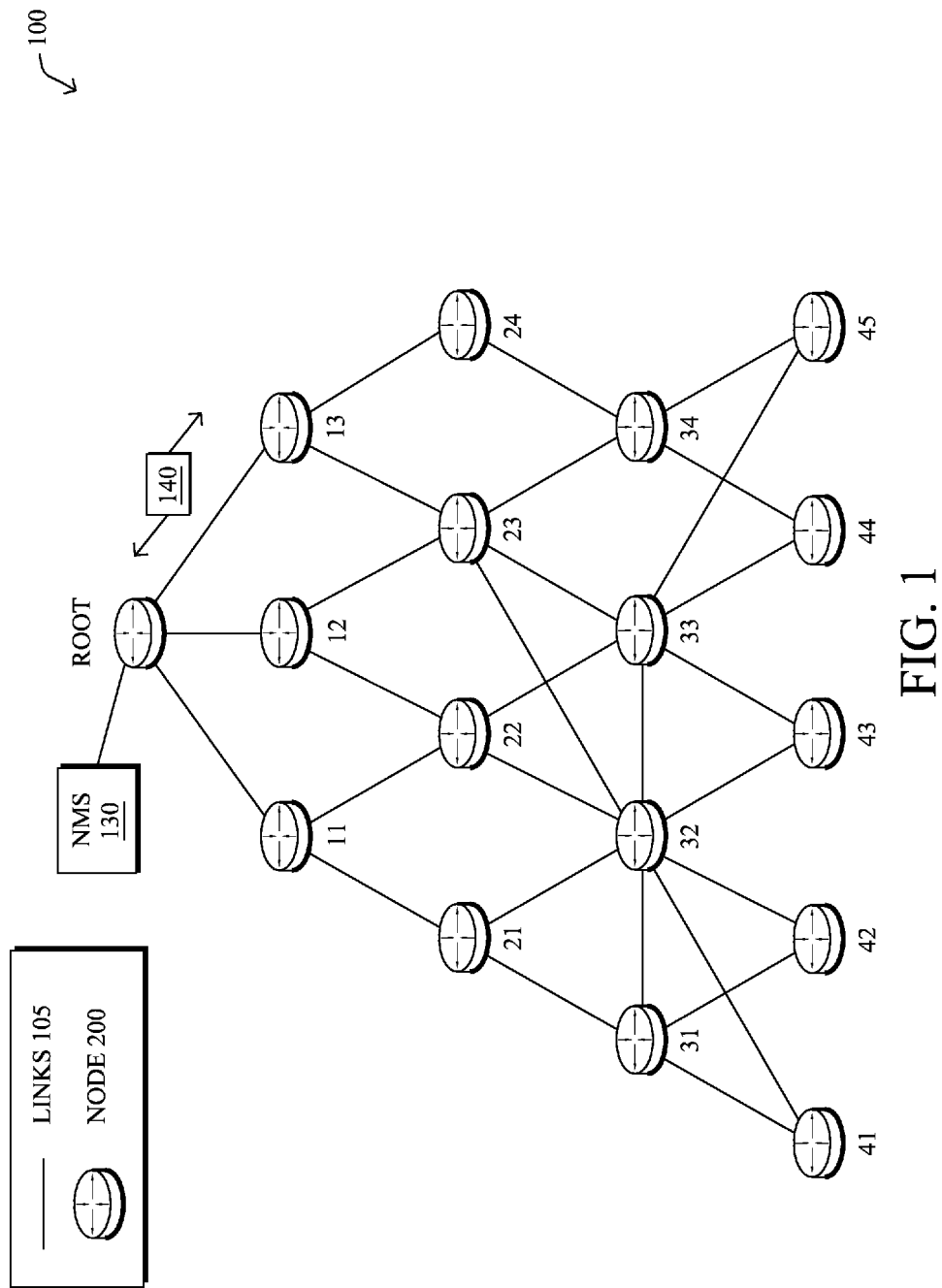
FIG. 1 illustrates an example communication network.

According to one or more embodiments of the disclosure, a capable node in a computer network may host a path computation element (PCE). The capable node may receive one or more neighborhood discovery messages including neighborhood information from a plurality of nodes in the computer network, and the PCE may compute a minimum spanning tree (MinTree) or a Directed Acyclic Graph (DAG) for the computer network based on the neighborhood information. The MinTree may divide the plurality of nodes in the computer network into a first subset of routing nodes (R nodes) and a second subset of host nodes (H nodes). The first subset of R nodes may form one or more interconnected paths of R nodes within the MinTree, and each H node within the second subset of H nodes may be located within one hop of at least one R node. The capable node may then communicate a MinTree message to the plurality of nodes in the computer network to build the MinTree by enabling routing on each R node in the first subset of R nodes.

According to one or more additional embodiments, a node in a computer network may receive a MinTree message from a capable node, and the MinTree message may divide a plurality of nodes in the computer network into a first subset of R nodes and a second subset of H nodes, the first subset of R nodes may form one or more interconnected paths of R nodes within the MinTree, and each H node within the second subset of H nodes may be located within one hop of at least one R node. Upon receiving the MinTree message, the node may self-identify, based on the MinTree message, as either an R node or an H node, and in response to self-identifying as an R node, enable routing functionality on the node.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
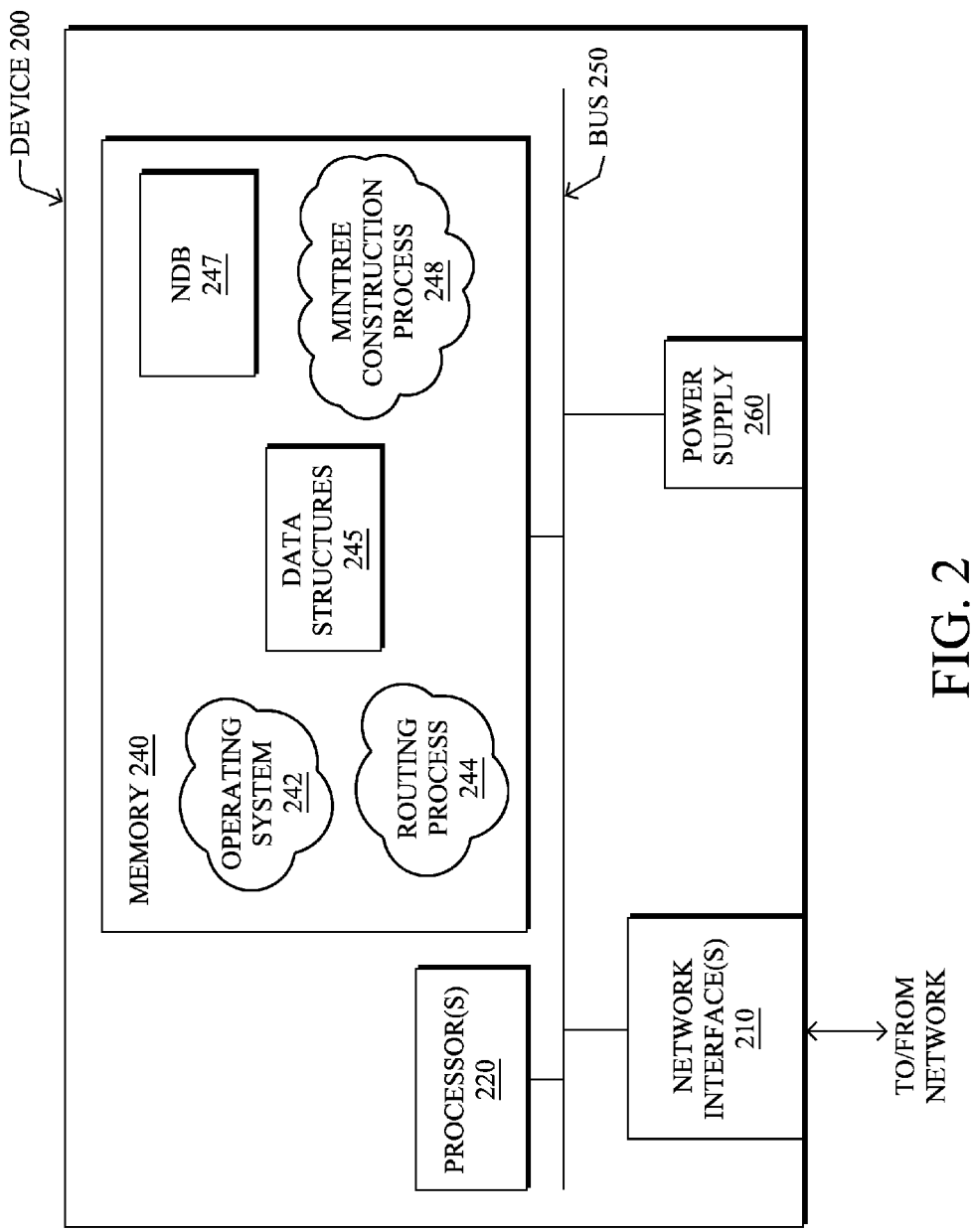
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a MinTree construction process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245 and/or a network database 247) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IPv6), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244) based on an Objective Function (OF). The role of the Objective Function is generally to specify rules on how to build the DAG (e.g. number of parents, backup parents, etc.).

MinTree-Based Routing in LLNs

The techniques herein provide for increased packet routing efficiency in a constrained computer network (e.g., an LLN) that may decrease convergence times and network traffic, while increasing the reliability of packet delivery within the network. As described in detail below, a capable node (e.g., a Root, LBR, NMS, FAR, etc.) may include a path computation element (PCE) that assesses collected network neighborhood information and computes a minimal tree (MinTree, or "MT") for the network. Nodes located within the MT may function as routing (R) nodes, while nodes that are not located within the MT may function as host (H) nodes, and each class of node may process packets in a different way. The PCE computes the MT so that all host nodes are within one hop of a routing node within the MT with the objective of minimizing the number of R nodes while meeting performance requirements for the network. Host nodes in the network may locally multicast their packets (as opposed to routing). Routing nodes, upon receiving a packet locally multicast by a host node, may remove the multicast header and forward the packets along the MT via a simple distributed algorithm that eliminates duplicate packets within the MT. In other words, rather than being "routed" per se, packets are locally multicast in such a way that duplicate packets are removed, packets are acknowledged, and the reliability of delivery is increased compared to traditional routing, while minimizing the level of code complexity required for the majority of nodes in the network.

Specifically, according to one or more embodiments of the disclosure as described in detail below, a capable node in a computer network may host a path computation element (PCE). The capable node may receive one or more neighborhood discovery messages including neighborhood information from a plurality of nodes in the computer network, and the PCE may compute a minimum spanning tree (MinTree) for the computer network based on the neighborhood information. The MinTree may divide the plurality of nodes in the computer network into a first subset of routing nodes (R nodes) and a second subset of host nodes (H nodes). The first subset of R nodes may form one or more interconnected paths of R nodes within the MinTree, and each H node within the second subset of H nodes may be located within one hop of at least one R node. The capable node may then communicate a MinTree message to the plurality of nodes in the computer network to build the MinTree by enabling routing on each R node in the first subset of R nodes.

According to one or more additional embodiments, a node in a computer network may receive a MinTree message from a capable node, and the MinTree message may divide a plurality of nodes in the computer network into a first subset of R nodes and a second subset of H nodes, the first subset of R nodes may form one or more interconnected paths of R nodes within the MinTree, and each H node within the second subset of H nodes may be located within one hop of at least one R node. Upon receiving the MinTree message, the node may self-identify, based on the MinTree message, as either an R node or an H node, and in response to self-identifying as an R node, enable routing functionality on the node.

Illustratively, the techniques described herein may be performed by hardware, software, and/or firmware, such as in accordance with the "MinTree construction" process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various routing protocols (e.g., RPL), and as such, may be processed by similar components understood in the art that execute those protocols, accordingly.

Operationally, the techniques herein may off-load the computation of a MinTree to a PCE that may be hosted on a capable node such as, for example, a Root, LBR, NMS, FAR, etc. The PCE may acquire enough information from nodes in the network (e.g., by neighborhood discovery) to identify a sufficient number of nodes to form a MinTree that provides connectivity to the vast majority of nodes that are not acting as routers (e.g., H nodes), but that instead may locally multicast their packets to the MinTree. In other words, according to the techniques herein, routing within a constrained network becomes a function that is implemented by a very minimal subset of nodes within the network, and packet forwarding is streamlined through the use of a local multicast mechanism.

Figure 3A:
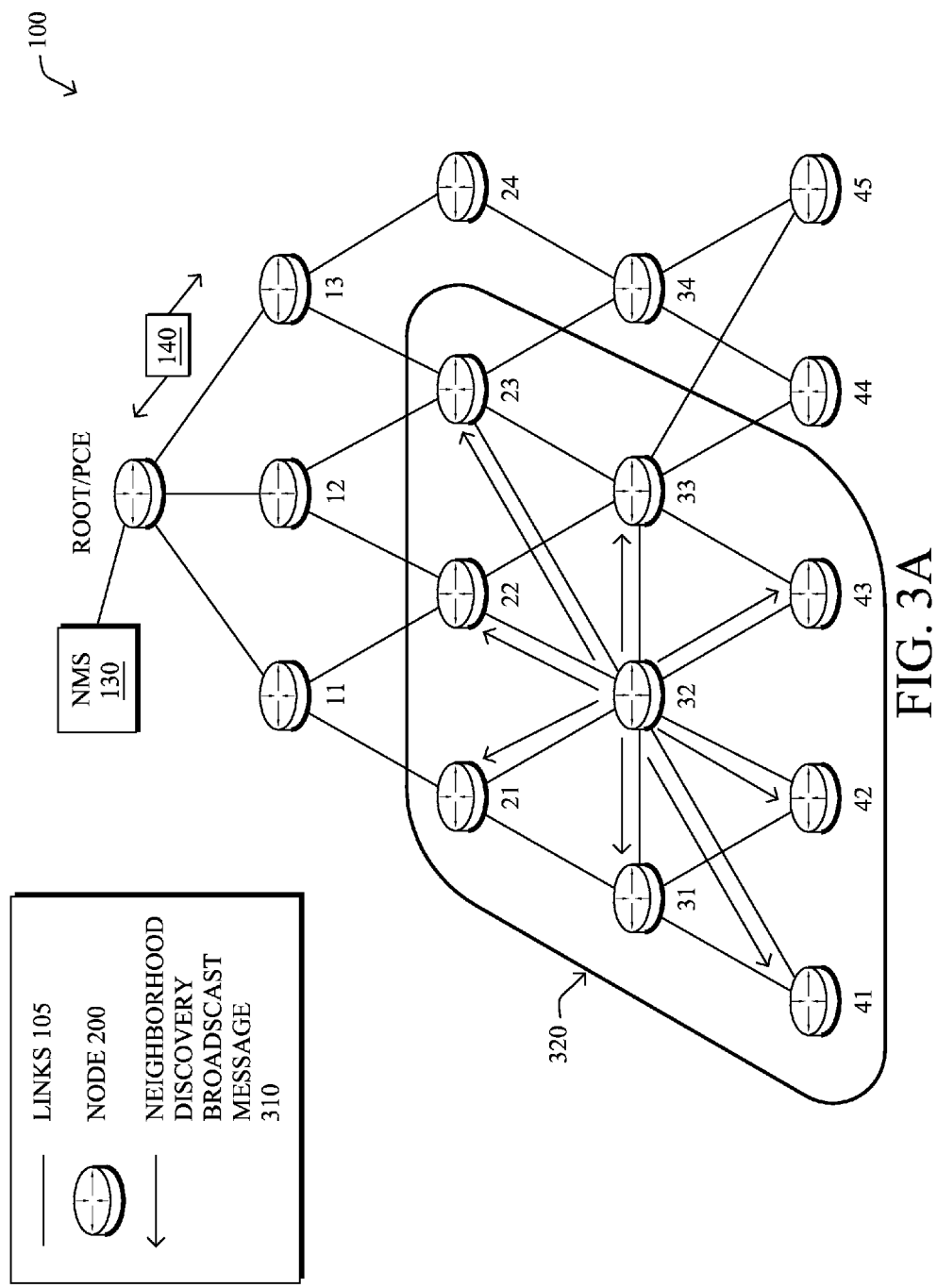
FIGS. 3A-3B illustrate example views of a neighborhood discovery process in an example communication network.
Figure 3B:
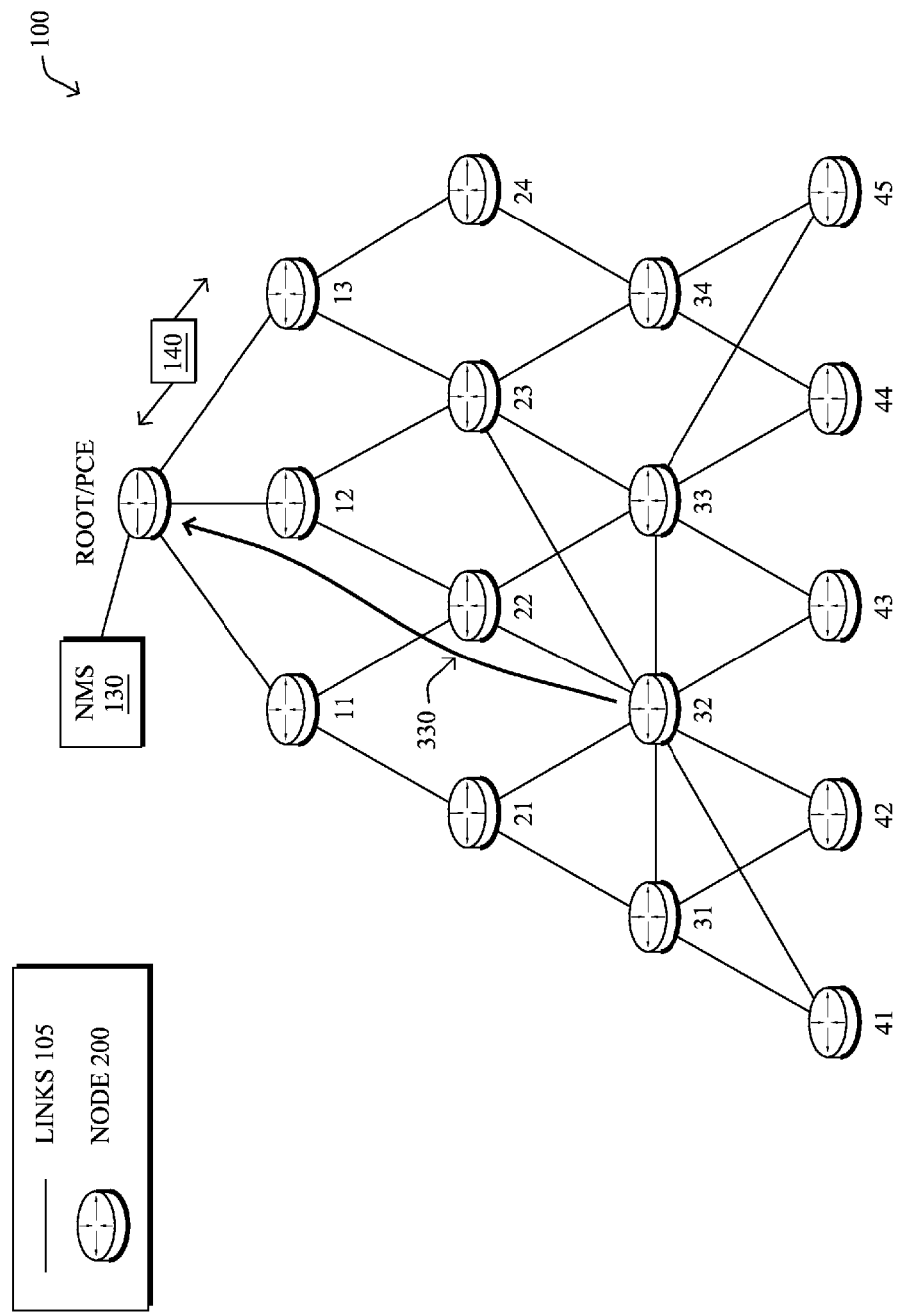

As noted above, the MinTree computation may be based, in part, on knowledge of the network neighborhood, which may be gathered by a variety of methods (e.g., neighborhood discovery, etc.). Illustratively, as shown in FIG. 3A, each node in the network may gather information about its neighborhood in order to build a list of neighbors, along with a corresponding metric such as link quality. Each node "$N_i$" (e.g., node 32 in FIG. 3A) may build a list "$L_i$" identifying neighbors and metrics of interest. For example, node 32 may compile a list of the form $<(x_1, m_1), \ldots, (x_k, m_i)>$, where $x_k$ may be the $k^{th}$ neighbor of node $N_i$, and $m_i$ may be a corresponding link quality metric (e.g., estimated transmission count (ETX), received signal strength indication (RSSI), signal-to-interference-plus-noise ratio (SINR), packet-delivery ratio (PDR), bit-error rate (BER), link quality indicator (LQI), etc.). In other words, node 32 may conduct neighborhood discovery 310 to build a list in which $X_1$-$X_k$ correspond to neighboring nodes 21, 22, 23, 31, 33, 41, 42, and 43 (e.g., neighbors 320 in FIG. 3A). In another embodiment, $m_i$ may correspond to a composite metric in which one or more metrics such as, e.g., ETX, RSSI, SINR, PDR, BER, LQI, etc. may be combined using a multi-variate function, or reported individually in a list. As shown in FIG. 3B, each list $L_i$ generated by a node $N_i$ may be encapsulated in a neighborhood discovery broadcast message 330 and sent to the Root/PCE, which may have a known address (e.g., the capable node hosting the PCE may have an address that is statically configured, auto-configured, etc.). According to the techniques herein, this broadcast message may always be received by the Root/PCE.

Figure 4A:
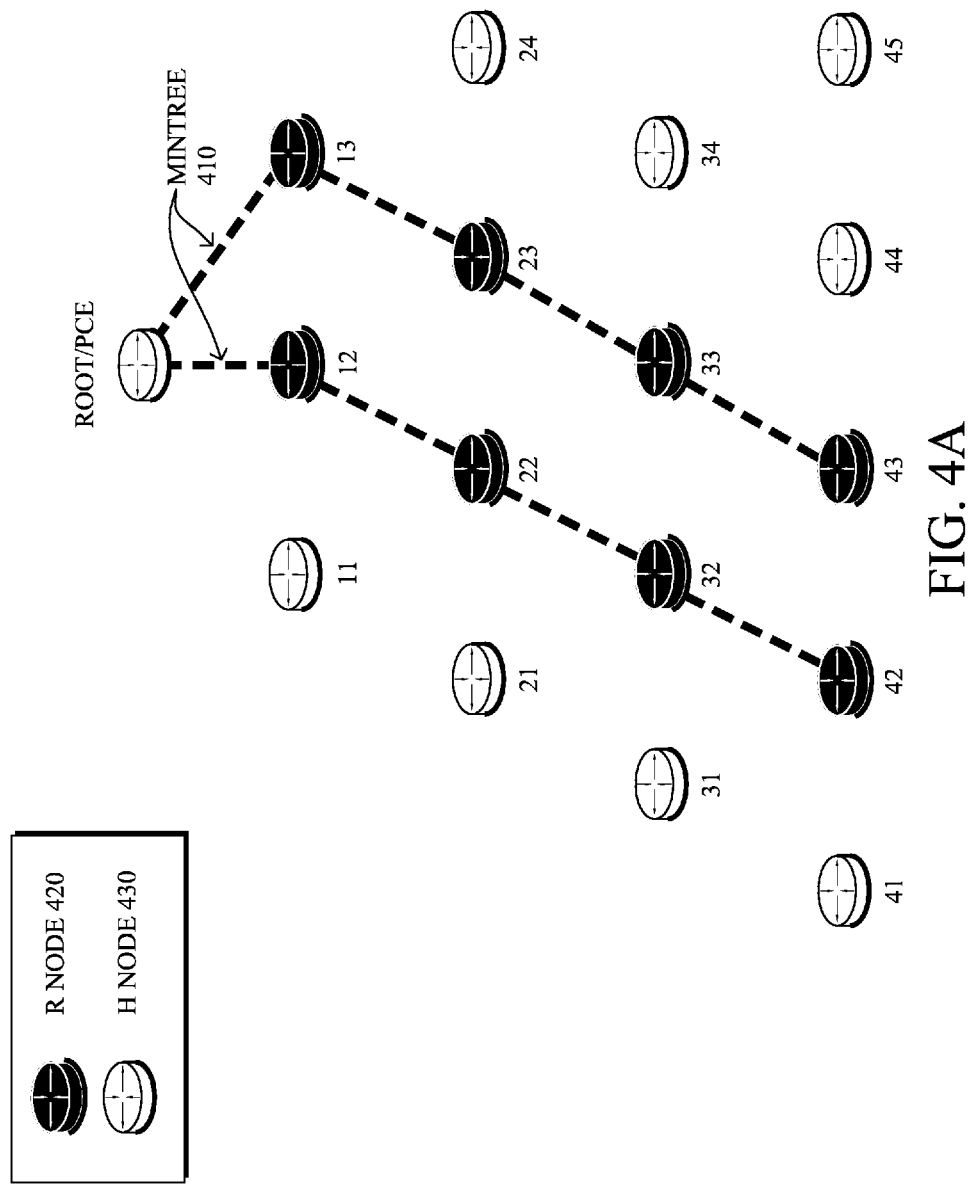
FIGS. 4A-4C illustrate examples of a MinTree formation process.

As shown in FIG. 3B, the PCE may collect one or more neighborhood discovery broadcast messages 330 and use the encapsulated set of lists $L_i$ contained therein to build a network database (NDB) 247, which may then be used to compute an exemplary computed MinTree 410, as shown in FIG. 4A, comprising two branches. It should be noted that computed MinTree 410 represents an approximate minimum spanning tree that makes it possible to communicate with all nodes in the network via a minimal number of nodes that effectively function as routers (e.g., R nodes 420), with the remaining acting solely as hosts (e.g., H nodes 430). Several advantages are provided by sharing details of the network topology with the PCE. For example, multiple MinTrees may be built for a given network by the PCE, where each MinTree may be constructed according to a different set of criteria. Additionally, in large scale networks, MinTrees may be segmented in a modular manner so that a certain part of the network has a sub-tree of the computed MinTree that remains constant, whereas another sub-tree of the MinTree may dynamically change in response to environmental characteristics. Furthermore, a MinTree may minimize the number of R nodes, and thus energy in the network since H nodes do not have to maintain routing information and benefit from running simpler code.

According to the techniques herein, a MinTree computation may be based on an iterative hierarchical constraint relaxation approach using, for example, the well-known Dijsktra algorithm, which has a complexity of n Log(n) (i.e., a fast running time) and allows solution for the shortest constraint paths in the network. Illustratively, the PCE may begin by removing all network links identified by the set of lists $L_i$ as having a link metric $M_i$ value above or below a particular threshold value (e.g., ETX>X, where "X" is a particular threshold value), which minimizes the number of nodes acting as R nodes (e.g., routers). The PCE may then compute the exemplary computed MinTree 410 (e.g., the corresponding shortest path tree) using, for example, the Dijkstra algorithm. In the event that a set of nodes within the network are disconnected (i.e., they cannot reach a R node in the MinTree), the value of X may be decremented (e.g., by hierarchical constraint relaxation) or incremented (depending on the metric type) until all nodes within the network are able to reach the MinTree, which may then be computed accordingly. In other words, the MinTree is the tree that may allow connection to all nodes, thus offering the most reliable path with the minimum number of nodes acting as routers (e.g., R nodes).

It is contemplated within the scope of the disclosure that if multiple MinTrees are formed for the same value of $M_i$, the PCE may track the various MinTrees in order to prevent disconnection of a subset of nodes in the network in the event of the failure of one or more nodes in the network. Note also that the PCE may compute a MinTree by taking into account the characteristics of nodes within the network (e.g., some nodes may not have routing functionality at all, others may be battery operated, etc.).

In another exemplary embodiment, the PCE may attempt to compute a MinTree as a minimum connected dominating set (MCDS), which may represent a spanning tree, but attempts to minimize the number of nodes/devices that need to perform routing functions. Because computing the MCDS is NP-Complete, conventional approximation algorithms may be used. In addition to requiring that the link qualities be above or below a particular threshold value, as described above, the MCDS computation engine may also require each node/device to have "X" number of "good" links to the MCDS.

Figure 4B:
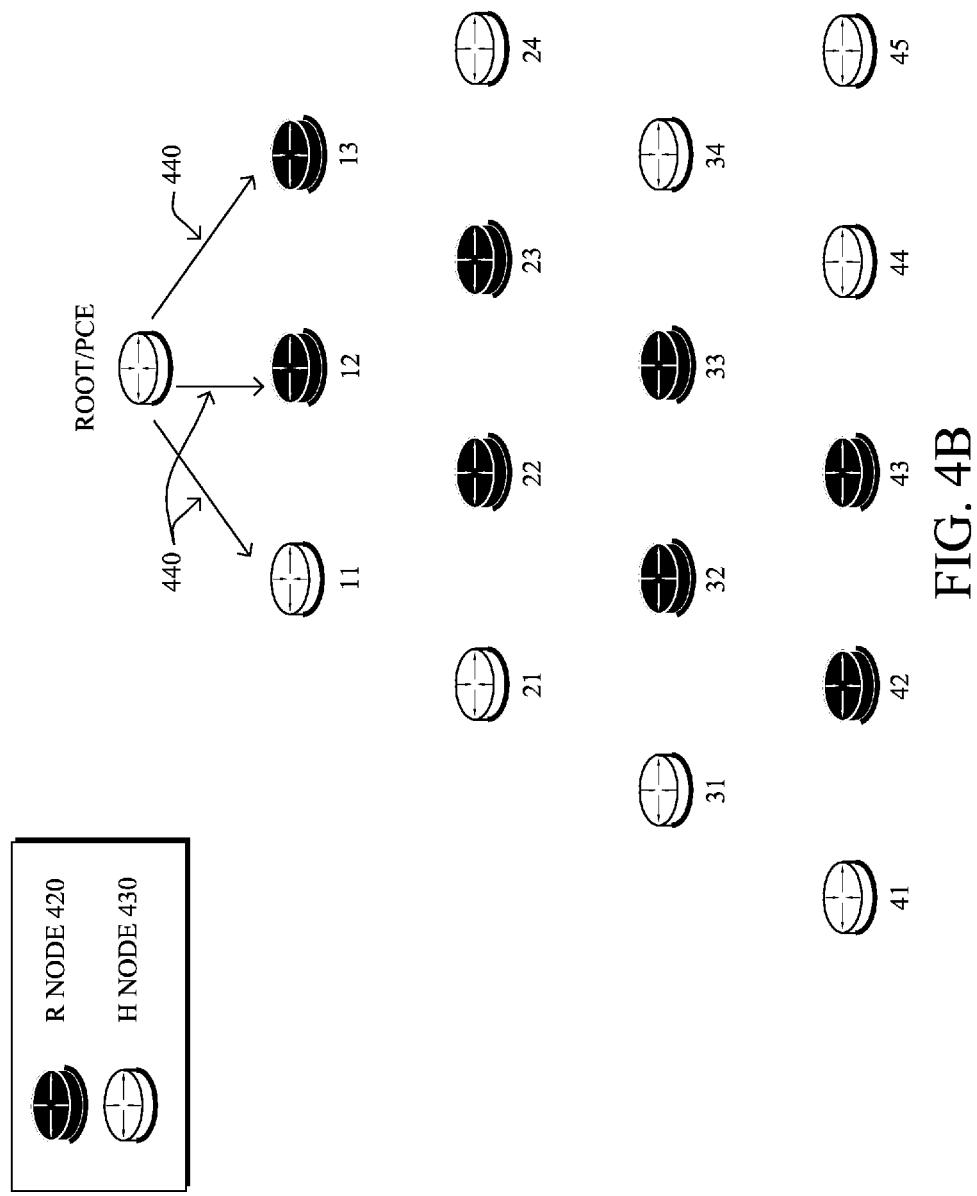
Figure 4C:
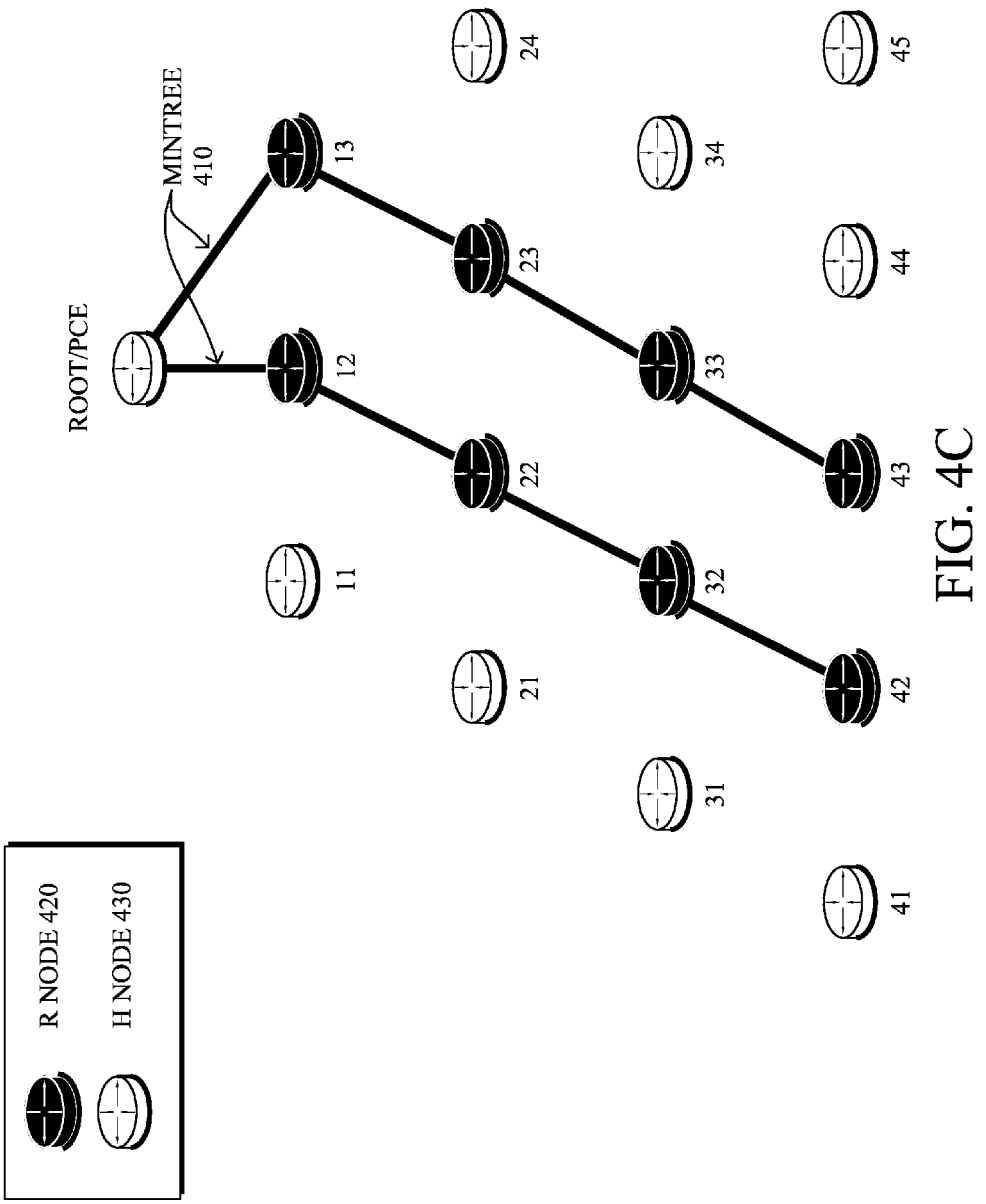

The computed MinTree 410 may then be built by encoding the computed MinTree 410 in a Bloom Filter (e.g., a compressed form of the tree) and disseminating it throughout the network using a MinTree broadcast message 440, as shown in FIG. 4B. The MinTree broadcast message 440 may be acknowledged by nodes in the network. It is contemplated within the scope of the disclosure that disseminating the MinTree broadcast message 440 may not be control plane intensive because the message is communicated only infrequently. It should be noted that the Bloom Filter may be used with a large number of hash functions and number of bits in order to avoid false negatives. However, according to the techniques herein such false negatives are not a major concern because they would simply lead to a MinTree that is larger than necessary. When MinTree broadcast message 440 has been disseminated, R nodes within the network may be identified, and MinTree 410 may be formed as shown in FIG. 4C.

Figure 5:
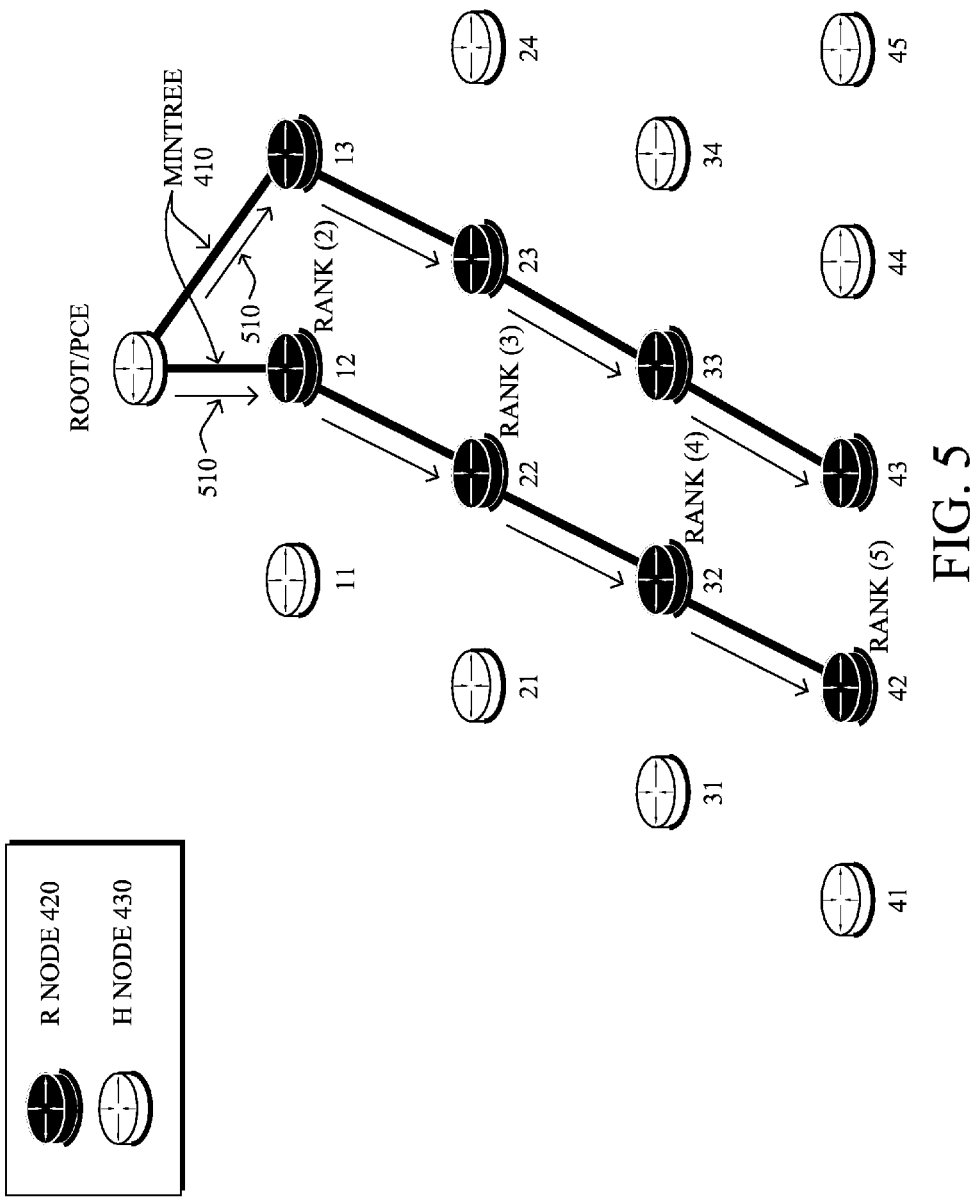
FIG. 5 illustrates an example R node ranking process.

Once MinTree 410 is formed, the techniques herein provide that individual R nodes within MinTree 410 may be individually ranked with respect to their distance from the Root/PCE. For example, the Root/PCE may send a ranking packet 510 destined to the far-end routers of each branch of MinTree 410 (e.g., R nodes 42 and 43), as shown in FIG. 5. Ranking packet 510 may have a counter that is incremented at each hop along each branch of MinTree 410 so that upon receiving ranking packet 510, each node in a branch of MinTree 410 may increment the counter, extract the counter, determine its rank, and forward the ranking packet to the next R node in the MinTree branch. Illustratively, if ranking packet 510 is sent from Root/PCE with the counter set to c=1, R node 12 may increment the counter to c=2, extract the counter value and determine that its rank is "2," and then forward the ranking packet 510 on to node 22, which may then increment the counter to c=3, extract the counter value and determine that its rank is "3" and continue the process down the MinTree branch so that node 32 may have a rank of "4" and node 42 may have a rank of "5." Note, of course, that the root/PCE could be rank "0", the nodes may extract the counter then increment it, etc., and the example shown herein is merely for illustration.

According to the techniques herein, packet routing efficiency may be significantly increased in a LLN using MinTree based routing because H nodes within the network may communicate packets via a local multicast designed to reach an R node on an adjacent MinTree branch. For example, when an H node $N_i$ needs to send a packet along MinTree 410, it may encapsulate the packet within an IPv6 packet in a local multicast packet with a first time to live (TTL) timer (T1)=T (e.g., the TTL may start with a value of T=K, and K=1 may usually be sufficient). The IPv6 hop-by-hop header may include a flag to indicate the communication mode of the packet, and that the packet must be acknowledged.

Figure 6A:
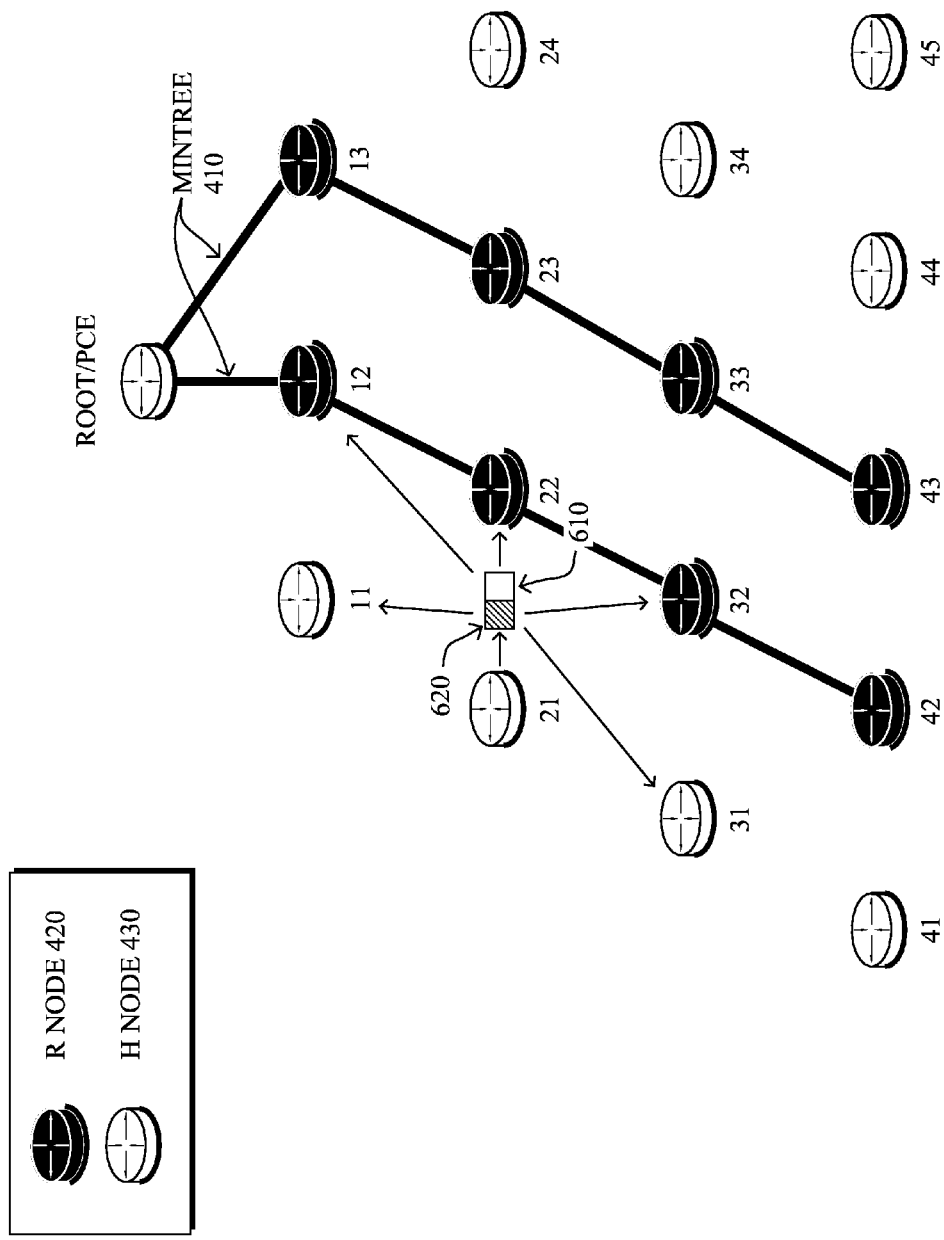
FIGS. 6A-6D illustrate an example packet forwarding process.
Figure 6B:
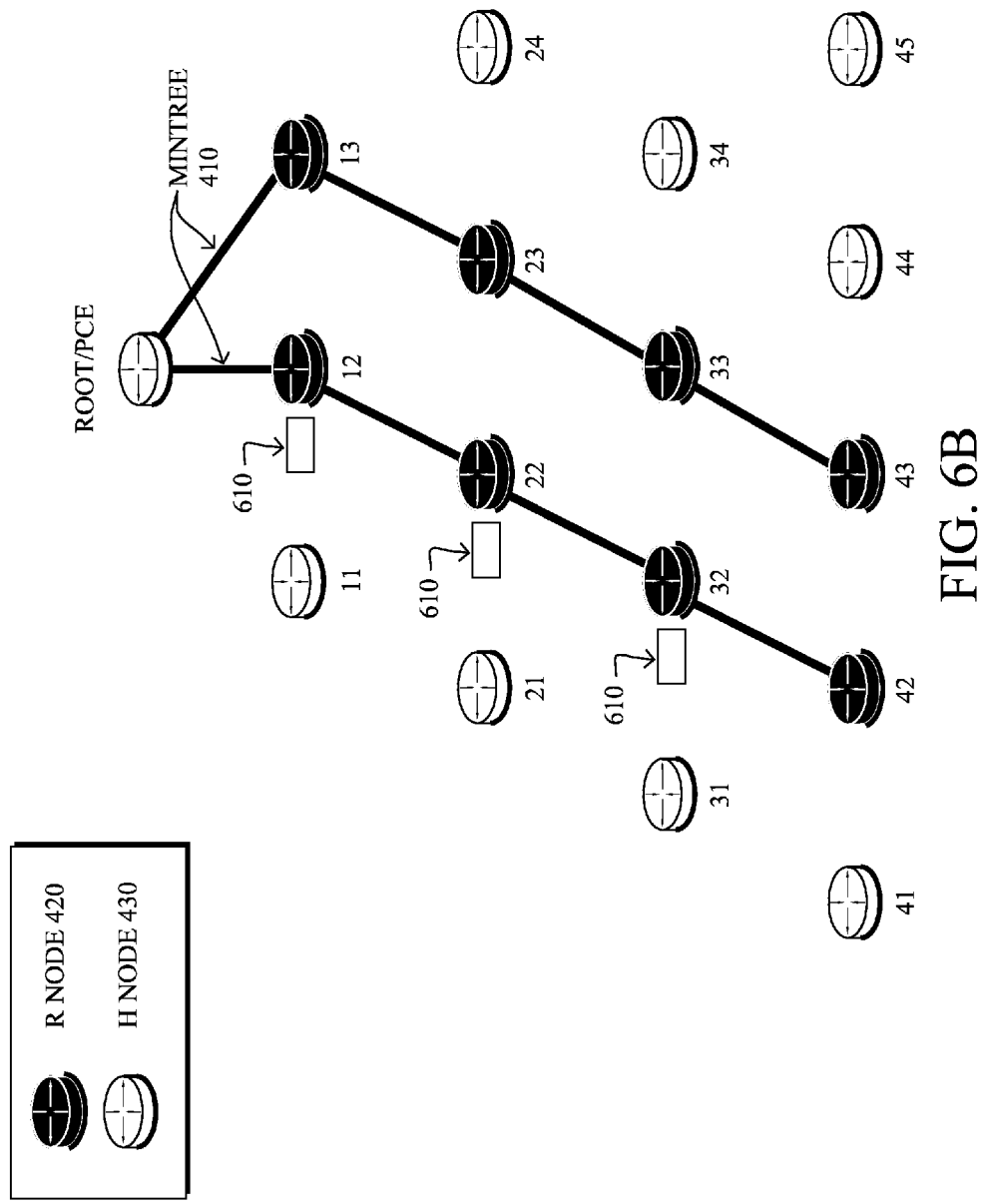
Figure 6C:
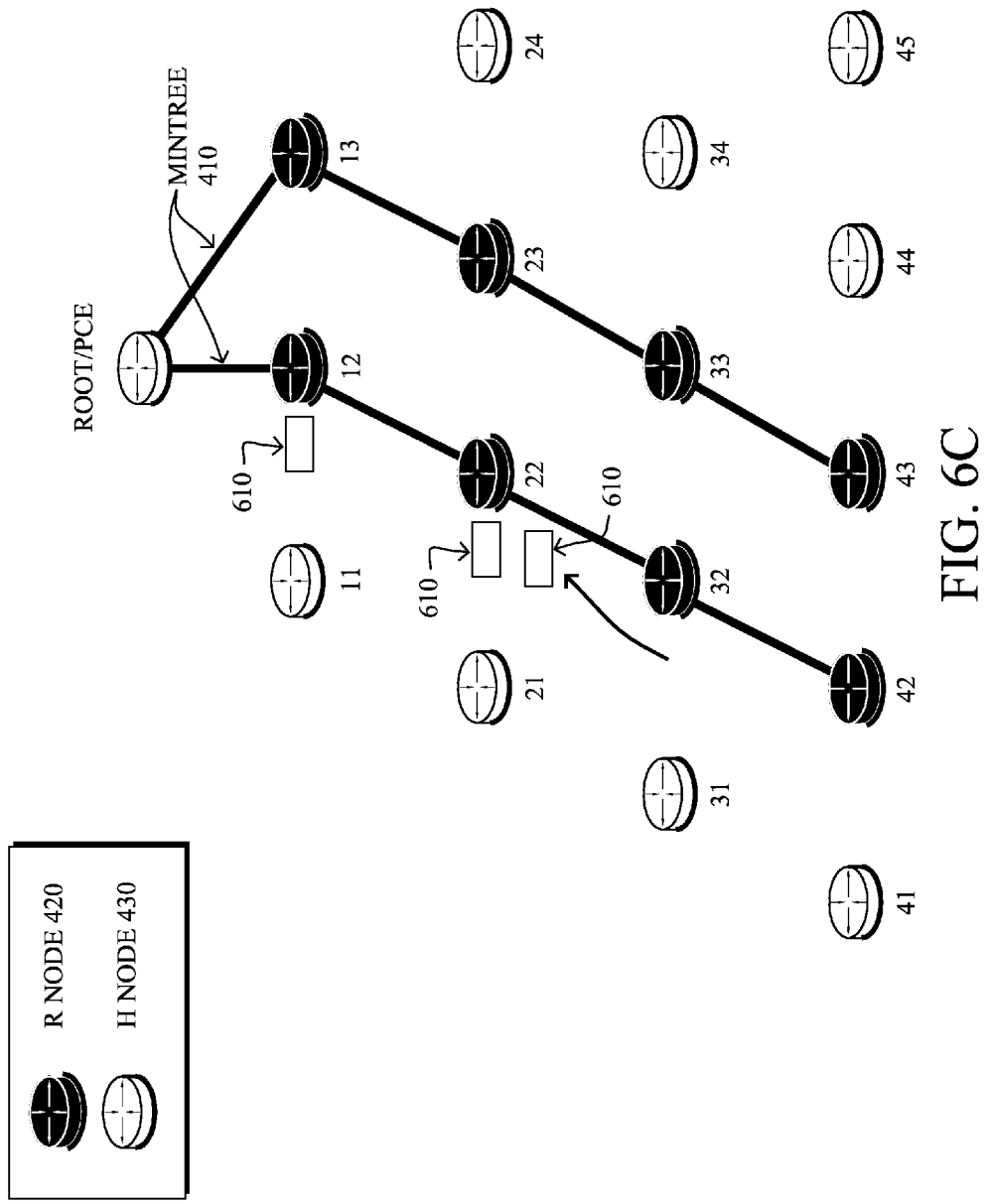
Figure 6D:
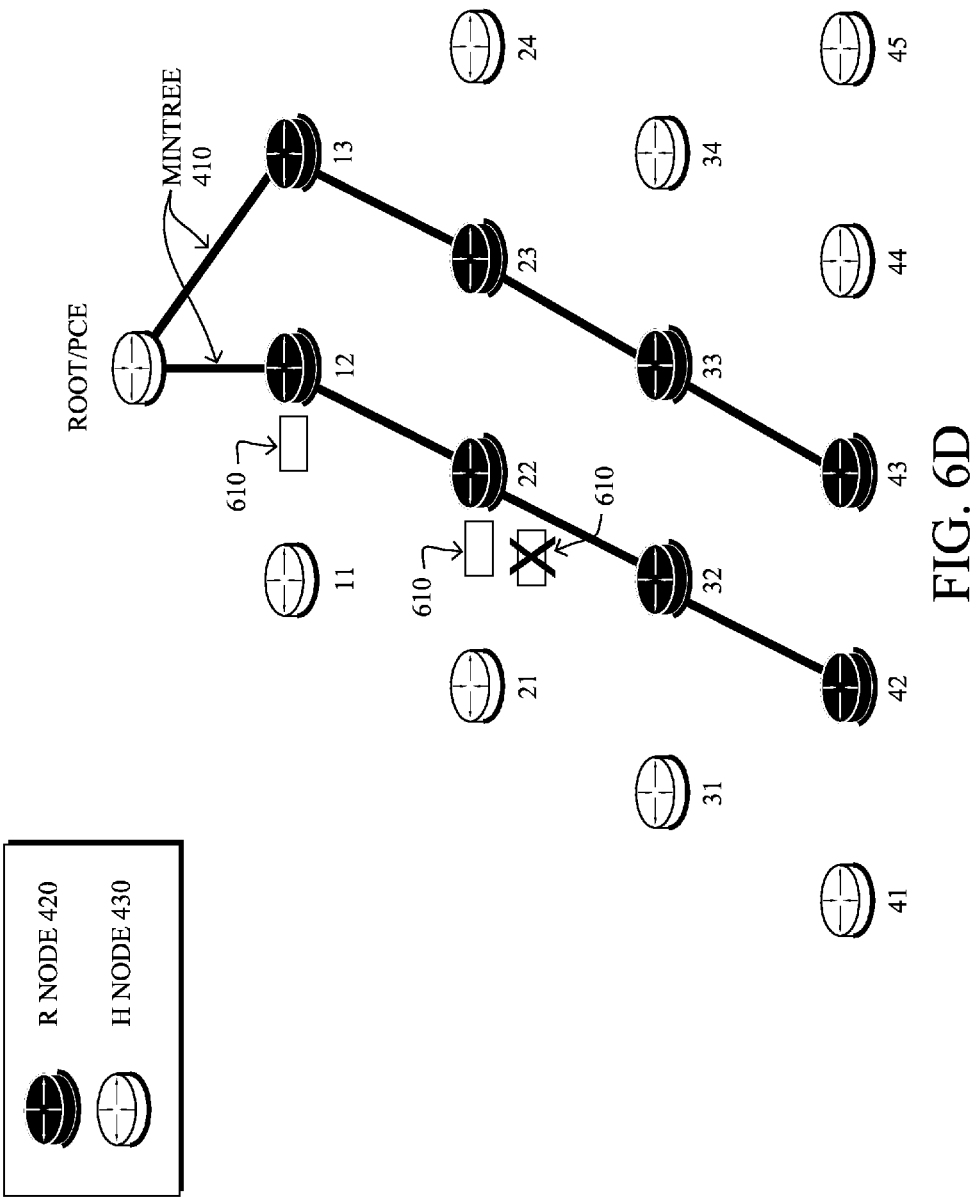

For example, as shown in FIG. 6A, node 21 may start TTL timer T1 and send a packet 610 including local multicast header 620 via local multicast to an exemplary target node outside of the LLN. Since nodes 11 and 31 are H nodes that do not have activated routing states, they may simply drop packet 610, unless, or course, they are the intended target. However, nodes 12, 22, and 32, which are R nodes within MinTree 410, have activated routing states and therefore may receive packet 610. As shown in FIG. 6B, nodes 12, 22, and 32 may receive packet 610, remove the local multicast header 620, and may start a TTL timer T2 that is inversely proportional to the receiving node's rank. After the expiration of TTL timer T2, each R node (e.g., nodes 12, 22, and 32) may forward packet 610 to its parent node in MinTree 410. For example, as shown in FIG. 6C, R node 32 may forward packet 610 to R node 22. According to the techniques herein, R node 22 may then determine if there is copy of the same packet 610 waiting to be forwarded, in which case packet 610 forwarded by R node 32 may be discarded, as shown in FIG. 6D. If no such copy of packet 610 is present at R node 22, then the packet may be forwarded to R node 12 (e.g., node 22's parent). Since duplicate packets are discarded, the techniques herein save bandwidth in the network, while also increasing the successful packet transmission rate because every transmitted packet may be received by multiple nodes.

In another embodiment, the techniques herein may use hashes of received packets, instead of timers inversely proportional to a node's rank. For example, upon receiving a local multicast packet, a node may immediately forward the unicast packet along the MinTree, and keep a hash of the packet for a period of time. If the same packet is received (e.g., as determined by the hash), the duplicate packet may be dropped. This approach may allow for faster forwarding compared to the above describe rank order forwarding, however, it requires that hashes be maintained locally on nodes.

In another exemplary embodiment, a R node may receive a packet and immediately send an acknowledgment message (ACK) to the transmitting node. It is contemplated within the scope of the disclosure that the R node may use hardware synchronization techniques when sending the ACK to avoid the effects of collisions. In yet another embodiment, the R node may send an ACK after a random delay bounded by T1 in attempt to reduce collisions with other neighboring nodes.

According to the techniques herein, if TTL timer T1 expires and no ACK has been received, the H node may simply retransmit the packet (e.g., for "X" number of times every "Y" ms). If after X trials, the packet could not be transmitted successfully, a broadcast message may be sent to the Root/PCE requesting that more H nodes be activated as R nodes, which may lead to the computation of a new MinTree by the PCE (a rare event). It should also be noted that the value of the TTL timer may be dynamically increased, allowing an H node receiving a link local multicast packet to retransmit the packet (e.g., the H node may temporarily act as a router) until a new version of the MinTree is computed. For example, if H node 21 cannot reach any of the R nodes 12, 22 or 32, H node 21 may retransmit the link local multicast packet after the X unsuccessful retransmission (e.g., H node 21 may set a novel flag, waiting for MinTree to be re-computed). Setting the novel flag may allow H nodes such as H node 11 to temporally act as routers. It should be further noted that upon receiving an ACK for the link local multicast packet, an H node may dynamically adapt the timer T1 after computing the average time to receive an ACK in order to avoid too many retransmissions in the event that the H nodes in the network initially used too large a value for T1.

To ensure that the MinTree has an optimal structure, the techniques herein provide several mechanisms by which the Root/PCE may determine when to re-compute and re-build a new MinTree(s) for the network. For example, a node within the network may continue to monitor the state of its neighborhood and trigger a MinTree update when the best link cost has either decreased or increased by, e.g., more than 5%, 10%, 15%, 20%, etc. As another example, the PCE, upon receiving regular neighborhood updates, may immediately and systematically re-compute the MinTree, evaluate the extent to which routing cost may be improved, and determine when to construct a new MinTree using bloom filters, as described above. In other words, the computation and signaling of the MinTree may be decoupled. It should be noted that computing a new MinTree(s) is not a bottleneck per se. Rather, a PCE-based policy may consist of re-advertizing a new MinTree only if the cost of the overall routing structure has changed by more than, e.g., 10%. Other policies may also be used. For example, one may monitor the SLA in the network and decide to advertise a new computed MinTree if the SLAs are no longer satisfied, even if the MinTree cost can be reduced by only 5%. In other words, depending on the configuration of the LLN(s) and its networking environment, updates on link qualities, changing topology and neighborhood may vary greatly. For example, the PCE may immediately re-compute a new MinTree, compare its cost with the current MinTree, and then determine whether the cost of signaling is worth the gain in terms of path quality and/or SLA. As yet another example, the PCE may decide to compute a new MinTree if the number of H nodes having to use other H nodes (e.g., acting as temporary routers) in order to reach the MinTree exceeds a specific threshold.

Figure 7:
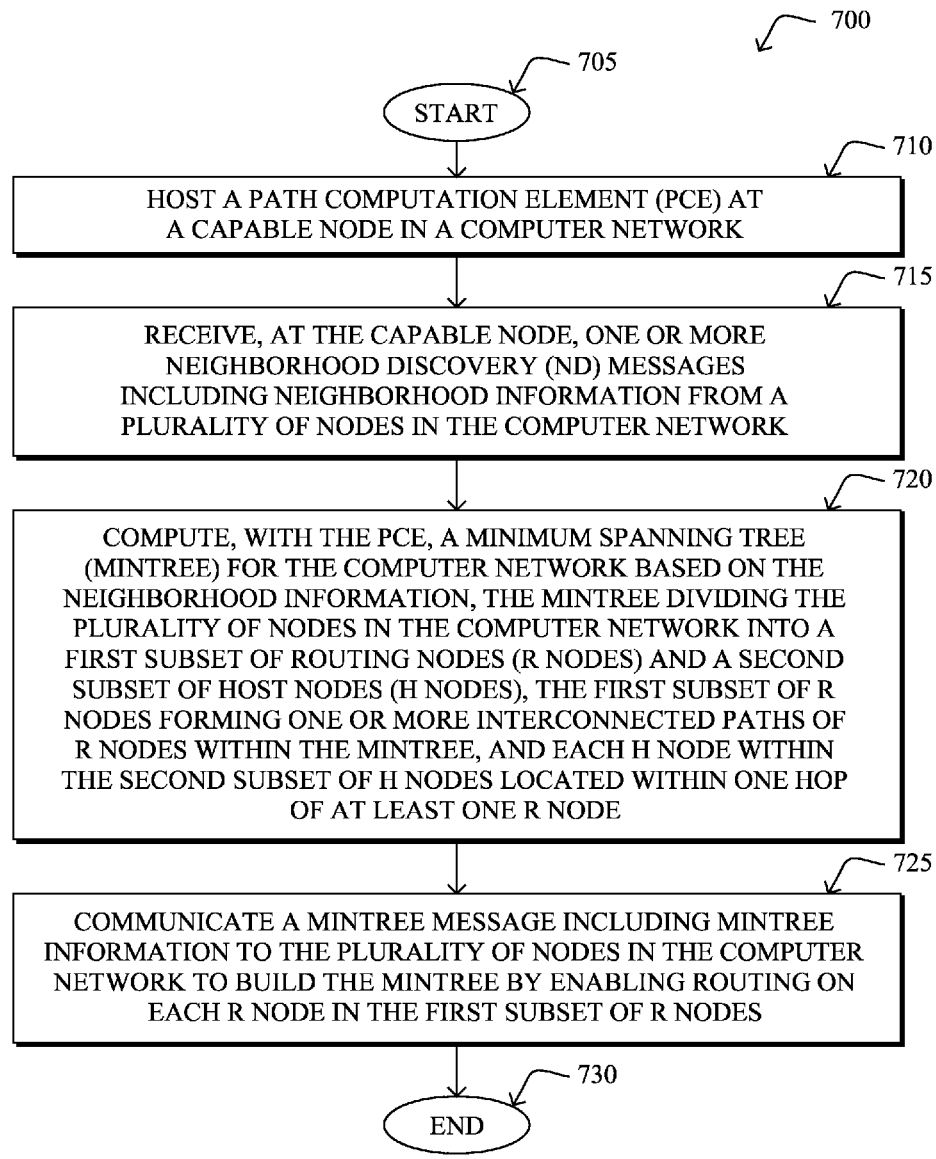
FIGS. 7-8 illustrate example simplified procedures for Mintree-based routing.

FIG. 7 illustrates an example simplified procedure for MinTree-based routing in a computer network in accordance with one or more embodiments described herein. The procedure 700 may start at step 705, and continues to step 710, where, as described in greater detail above, a capable node in a computer network may host a path computation element (PCE). The procedure 700 may then continue to step 715, in which the capable node may receive one or more neighborhood discovery messages including neighborhood information from a plurality of nodes in the computer network. As shown in step 720, the PCE may then compute a minimum spanning tree (MinTree) for the computer network based on the neighborhood information, the MinTree may divide the plurality of nodes in the computer network into a first subset of routing nodes (R nodes) and a second subset of host nodes (H nodes), and the first subset of R nodes may form one or more interconnected paths of R nodes within the MinTree, and each H node within the second subset of H nodes may be located within one hop of at least one R node. The procedure 700 may then proceed to step 725, in which the capable node may communicate a MinTree message to the plurality of nodes in the computer network to build the MinTree by enabling routing on each R node in the first subset of R nodes. The procedure 700 illustratively ends in step 730.

Figure 8:
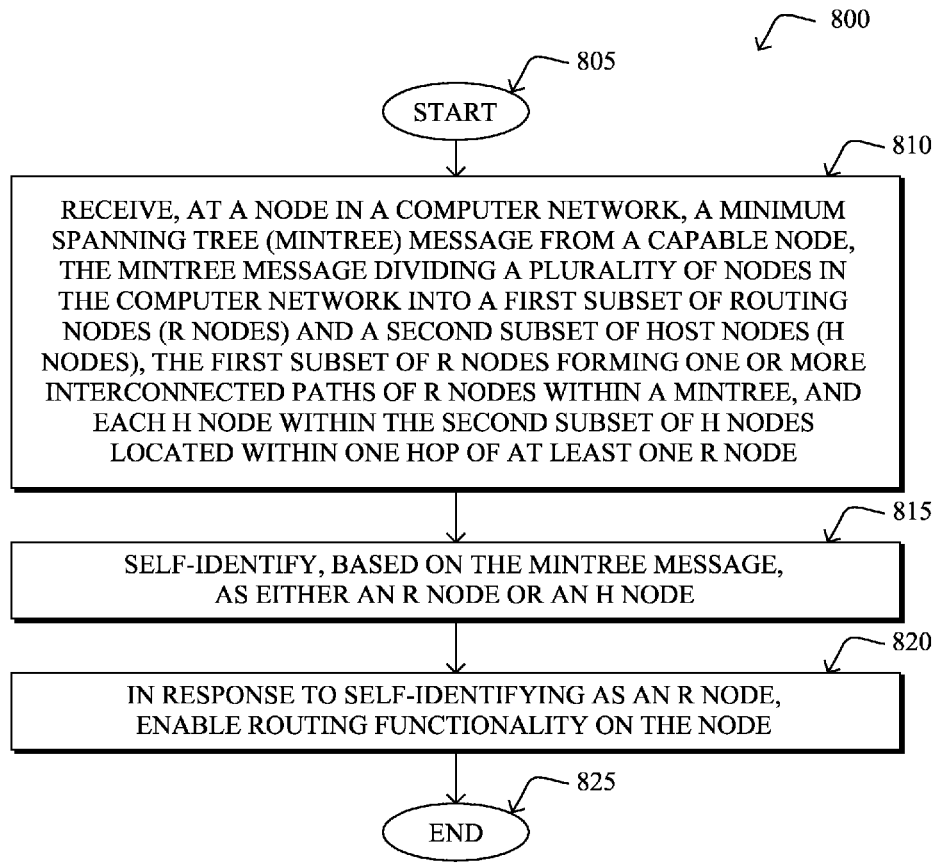

FIG. 8 illustrates another example simplified procedure for MinTree-based routing in a computer network in accordance with one or more embodiments described herein. The procedure 800 may start at step 805, and continues to step 810, where, as described in greater detail above, a node in a computer network may receive a MinTree message from a capable node, and the MinTree message may divide a plurality of nodes in the computer network into a first subset of R nodes and a second subset of H nodes, the first subset of R nodes may form one or more interconnected paths of R nodes within the MinTree, and each H node within the second subset of H nodes may be located within one hop of at least one R node. The procedure 800 may then continue to step 815 where, upon receiving the MinTree message, the node may self-identify, based on the MinTree message, as either an R node or an H node. As shown in step 820, in response to self-identifying as an R node, the node may enable routing functionality on the node. The procedure 800 illustratively ends in step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for MinTree-based routing in highly constrained environments by dividing the population of network nodes into routing nodes (e.g., R nodes) and host nodes (e.g., H nodes). The techniques herein provide that H nodes do not activate any routing functions, and simply "drop" any packet that is communicated to them by another H node or R node, unless they are the intended target of the packet. Advantageously, this increases routing efficiency in the network by saving control plane overhead in terms of, e.g., processing, memory and complexity, which may be extremely important in highly constrained networks comprising a significant number of nodes/devices that have minimal processing capacity, memory, power stores (e.g., battery operated), etc. Additionally, the techniques herein greatly simplify the process of troubleshooting routing issues within the network. Furthermore, the techniques herein increase the reliability of packet delivery since packets are received by multiple recipients, however, control plane overhead is not similarly increased because duplicate messages may be efficiently removed. It should also be noted that the techniques herein may also function to decrease convergence time because there is no need to wait for an ACK and choose another next hop.

While there have been shown and described illustrative embodiments that provide for MinTree-based routing in a highly constrained environment (e.g., a LLN, a sensor-actuator fabric (SAF), a shared-media communication network, etc.) it is to be understood that various other adaptations and modifications may be made within the spirit and scope of the embodiments herein. For example, the embodiments have been shown and described herein with relation to LLN networks. However, the embodiments in their broader sense are not as limited, and may, in fact, be used with other types of shared-media networks and/or protocols (e.g., wireless), whether constrained or not. In addition, while certain protocols are shown, such as RPL, other suitable protocols may be used, accordingly. Also, while the techniques generally describe initiation and determinations by a head-end node (e.g., Root/PCE), a network management system/server (NMS) may also be used to provide intelligence to the network functions described herein, such that the NMS may receive neighborhood discovery broadcast messages 330, may build network database (NDB) 247, and may select which nodes to act as routers, etc. It should also be noted that while the techniques herein have been described with respect to computing a MinTree, a MinTree is merely one example implementation. That is, the techniques may generally include computing a DAG (or sub-DAG) of R nodes as described above, without the R nodes necessarily being configured as a MinTree, as may be appreciated by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   hosting a path computation element (PCE) at a capable node in a computer network;
   receiving, at the capable node, one or more neighborhood discovery (ND) messages including neighborhood information from a plurality of nodes in the computer network;
   computing centrally in the computer network, with the PCE, a minimum spanning tree (MinTree) for the plurality of nodes in the computer network based on the neighborhood information, the MinTree dividing the plurality of nodes in the computer network into a first subset of routing nodes (R nodes) and a second subset of host nodes (H nodes), the first subset of the R nodes forming one or more interconnected paths of the R nodes within the MinTree, and each H node within the second subset of the H nodes located within one hop of at least one R node; and
   communicating a MinTree message including MinTree information to the plurality of nodes in the computer network to build the MinTree, the Min Tree information providing information identifying which nodes of the plurality of nodes are R nodes and which nodes of the plurality of nodes are H nodes, the Min Tree information enabling routing on each R node in the first subset of the R nodes.

2. The method as in claim 1, further comprising:
   communicating a ranking message to the first subset of the R nodes in the MinTree, the ranking message assigning a rank to each of the R nodes in the one or more interconnected paths relative to the capable node.

3. The method as in claim 2, wherein the ranking message includes a rank counter that is incremented at each hop.

4. The method as in claim 1, wherein the MinTree information is encoded in a bloom filter.

5. The method as in claim 1, further comprising:
building a network database based on the neighborhood information received in the one or more ND messages.

6. The method as in claim 1, wherein the neighborhood information comprises a list of neighbors, links, and metric data corresponding to each link.

7. The method as in claim 6, wherein computing further comprises:
removing all nodes from the neighborhood information with links in which the corresponding metric data is above or below a particular threshold value to create a MinTree dataset; and
performing a constrained shortest path first (CSPF) algorithm based on the MinTree dataset to solve for the MinTree.

8. The method as in claim 1, further comprising:
computing one or more additional MinTrees; and
communicating one or more additional MinTree messages including the MinTree information about the one or more additional MinTrees to the plurality of nodes in the network to build the one or more additional MinTrees.

9. The method as in claim 8, wherein the one or more additional MinTrees are computed based on different criteria.

10. A method, comprising:
receiving, at a node in a computer network, a minimum spanning tree (MinTree) message from a capable node centrally located in the computer network, the MinTree message dividing a plurality of nodes in the computer network into a first subset of routing nodes (R nodes) and a second subset of host nodes (H nodes), the first subset of the R nodes forming one or more interconnected paths of the R nodes within a MinTree, and each H node within the second subset of the H nodes located within one hop of at least one R node;
self-identifying, based on the MinTree message, as either one of the R nodes or one of the H nodes;
in response to the node self-identifying as one of the R nodes, enabling routing functionality on the node; and
determining a relative rank of the node self-identified as one of the R nodes with respect to one or more of the R nodes in the one or more interconnected paths of the R nodes within the MinTree, wherein a higher rank indicates a further distance from a root node of the MinTree than a lower rank.

11. The method as in claim 10, further comprising:
receiving, at the node, a message including a local multicast header from an H node located outside of the MinTree;
removing the local multicast header from the message;
determining whether the message is a duplicate of a previously received message; and
forwarding the message to a second R node in the one or more interconnected paths of the R nodes in the MinTree having the lower rank if the message is not the duplicate of the previously received message.

12. The method as in claim 11, further comprising:
sending an acknowledgment message to the H node located outside of the MinTree.

13. The method as in claim 10, wherein the message is a packet encapsulated in an IPv6 packet including the local multicast header.

14. The method as in claim 10, wherein the message comprises a time to live (TTL) timer.

15. The method as in claim 14, wherein the TTL timer is set to 1.

16. The method as in claim 10, further comprising:
locally multicasting, from the node self-identified as an H node, a message including a local multicast header for receipt by one of the R nodes in the MinTree.

17. An apparatus, comprising:
one or more network interfaces to communicate with a computer network;
a processor coupled to the network interfaces and adapted to execute one or more processes; and
a memory configured to store a process executable by the processor, the process when executed operable to:
host a path computation element (PCE) at a capable node in a computer network;
receive, at the capable node, one or more neighborhood discovery (ND) messages including neighborhood information from a plurality of nodes in the computer network;
compute centrally in the computer network, with the PCE, a minimum spanning tree (MinTree) for the plurality of nodes in the computer network based on the neighborhood information, the MinTree dividing the plurality of nodes in the computer network into a first subset of routing nodes (R nodes) and a second subset of host nodes (H nodes), the first subset of the R nodes forming one or more interconnected paths of the R nodes within the MinTree, and each H node within the second subset of H nodes located within one hop of at least one R node of the R nodes; and
communicate a MinTree message including MinTree information to the plurality of nodes in the computer network to build the MinTree, the Min Tree information providing information identifying which nodes of the plurality of nodes are R nodes and which nodes of the plurality of nodes are H nodes, the Min Tree information enabling routing on each R node in the first subset of the R nodes.

18. The apparatus as in claim 17, wherein the process when executed is further operable to:
compute one or more additional MinTrees; and
communicate one or more additional MinTree messages including the MinTree information about the one or more additional MinTrees to the plurality of nodes in the network to build the one or more additional MinTrees.

19. An apparatus, comprising:
one or more network interfaces to communicate with a computer network;
a processor coupled to the network interfaces and adapted to execute one or more processes; and
a memory configured to store a process executable by the processor, the process when executed operable to:
receive, at a node in a computer network, a minimum spanning tree (MinTree) message from a capable node centrally located in the computer network, the MinTree message dividing a plurality of nodes in the computer network into a first subset of routing nodes (R nodes) and a second subset of host nodes (H nodes), the first subset of the R nodes forming one or more interconnected paths of the R nodes within a MinTree, and each H node within the second subset of the H nodes located within one hop of at least one R node;
self-identify, based on the MinTree message, as either one of the R nodes or one of the H nodes; in response to self-identifying as one of the R nodes, enable routing functionality on the node; and
determine a relative rank of the node self-identified as one of the R nodes with respect to one or more of the R nodes in the one or more interconnected paths of the R nodes within the MinTree, wherein a higher rank indicates a further distance from a root node of the MinTree than a lower rank.

20. The apparatus as in claim 19, wherein the process when executed is further operable to:
receive, at the node self-identified as one of the R nodes, a message including a local multicast header from an H node located outside of the MinTree;
remove the local multicast header from the message;
determine whether the message is a duplicate of a previously received message; and forward the message to a second R node in the one or more interconnected paths of the R nodes in the MinTree having the lower rank if the message is not a duplicate of a previously received message.

21. The apparatus as in claim 19, wherein the process when executed is further operable to:
locally multicast, from the node self-identified as one of the H nodes, a message including a local multicast header for receipt by one of the R nodes in the MinTree.

* * * * *